US007089172B2

(12) United States Patent
Lines et al.

(10) Patent No.: US 7,089,172 B2
(45) Date of Patent: Aug. 8, 2006

(54) SYSTEM AND METHOD FOR SIMULATING A COMPUTER ENVIRONMENT AND EVALUATING A USER'S PERFORMANCE WITHIN A SIMULATION

(75) Inventors: Vardell Lines, American Fork, UT (US); Kathy Chen-Wright, Morgan, UT (US)

(73) Assignee: TestOut Corporation, Pleasant Grove, UT (US)

( * ) Notice: Subject to any disclaimer, the term of this patent is extended or adjusted under 35 U.S.C. 154(b) by 745 days.

(21) Appl. No.: 10/329,836

(22) Filed: Dec. 26, 2002

(65) Prior Publication Data

US 2003/0176993 A1    Sep. 18, 2003

Related U.S. Application Data

(60) Provisional application No. 60/344,195, filed on Dec. 28, 2001.

(51) Int. Cl.
G06F 9/44 (2006.01)

(52) U.S. Cl. .......................................... 703/21; 703/22
(58) Field of Classification Search ................ 703/21, 703/22, 6
See application file for complete search history.

(56) References Cited

U.S. PATENT DOCUMENTS 5,313,620 A * 5/1994 Cohen et al. ............... 713/375
5,907,696 A   5/1999 Stilwell et al.
6,931,366 B1 * 8/2005 Wang et al. .................. 703/2
6,978,244 B1 * 12/2005 Rovinelli et al. .............. 705/2
7,006,963 B1 * 2/2006 Maurer ........................ 703/21

FOREIGN PATENT DOCUMENTS

JP             402202641 A   *   8/1990

* cited by examiner

Primary Examiner—Albert W. Paladini
(74) Attorney, Agent, or Firm—Thorpe North & Western LLP

(57) ABSTRACT

A system and method is provided for simulating a computer environment and evaluating a user's performance within a simulation which uses the computer environment. The method reads base data which defines a simulated component within a simulated computer environment. Initial condition data may also be read to modify a simulated component. The simulated computer environment is represented by executing one or more simulators to simulate actual software modules. A simulation is presented to a user. The simulation includes a scenario and a set of tasks to be completed. As the user interacts with the simulators, tasks completed by the user are recorded. Finally, the set of completed tasks are evaluated to determine a user's performance within the simulation. The system and method allows a simulation author to automatically define a set of possible tasks for a simulation by performing the desired tasks in the simulated computer environment. The system and method provides a robust evaluation process for simulations. Partial scores, weighted scores, partially weighted scores, and binary scores are provided, as well as rescoring of simulations and simulation-based exam question seeding.

29 Claims, 8 Drawing Sheets

SYSTEM AND METHOD FOR SIMULATING A COMPUTER ENVIRONMENT AND EVALUATING A USER'S PERFORMANCE WITHIN A SIMULATION

This application claims priority to U.S. Provisional Application Ser. No. 60/344,195 filed on Dec. 28, 2001 as SYSTEM AND METHOD FOR SCORING A STUDENT'S PERFORMANCE ON AN EDUCATIONAL AND COMPETENCY TRAINING SIMULATION.

FIELD OF THE INVENTION

The present invention relates generally to the field of computer simulators. More specifically, the present invention relates to a system and method for simulating a computer environment and evaluating a user's performance within a simulation.

DESCRIPTION OF RELATED BACKGROUND ART

Computers and information technology may be quite complex. From the software and middleware to the hardware and connections for communicating between machines, the technologies such as hardware, protocols, languages, software packages, and software standards involved is large and changes rapidly. Accordingly, companies, governments, associations and other organizations rely on proficient programmers, network administrators, database administrators, and other IT (Information Technology) professionals to keep their computer systems functioning properly and efficiently.

To become and remain employable, these IT professionals must be able to keep up and prove they can provide the services the employer seeks, often before being offered an IT employment position. Due to the high costs and high risks of using unskilled employees, employers are often unwilling to allow employees to learn the necessary skills on the job. In addition, universities and colleges do not teach all of the specific programming languages, hardware devices, or protocols used in the industry. Instead, using a select few, they focus on theory and principles common across the technologies.

Thus, to provide the credentials demanded by employers, the IT industry uses certification exams, particularly in the software industry. This effort is often led by vendors of the different technologies. The certification asserts that the vendor considers the certificate holder competent to use and maintain the IT technology being certified. Novell®, Microsoft® and others offer certification exams such as CNE (Certified NetWare Engineer), MCP (Microsoft Certified Professional), MCSE (Microsoft Certified Systems Engineer), and others.

However, conventional certification exams which use multiple choice and fill-in-the-blank questions are limited in their ability to measure behavioral skills. Some examinees may simply be good at memorizing rules and appropriate answers but lack the skills needed to perform "real world" tasks. Alternatively, the examinees may prepare for the exam by storing the answers in short term memory. Once the exam is over and the examinee has passed, the facts are quickly forgotten.

Essentially, the examinee lacks the kind of knowledge which is best obtained through the experience of applying the concepts and principles in real life situations or in a simulated environment. As competition has increased in the IT field, the certification exams have begun to focus greater proportions of their exams on testing an examinee's knowledge and skill in relation to an IT system rather than their ability to retain and recall technical information. This means the exams are setting objectives for the examinees which conventional test questions fail to adequately meet or measure.

For example, rather than require that an examinee know how to configure a network card. The certification exams are requiring that the examinee demonstrate an ability to configure the network card. This kind of objective is best assessed using a simulation or an actual IT environment.

The certification exams of today are designed to test an examinee's competence in using the particular technology, software, administration tool, or the like. These are the skills the employers want to know an applicant possesses. Crafting an exam question to test an examinee's ability to use the technology is very difficult without conducting a one-on-one assessment much like an actual driving test with a DMV official to receive a driver's license. Generally, due to the number of exams given and the number of examinees, one-on-one assessments are impractical.

To address these limitations, interactive exam questions have been developed which are directed toward an examinee's behavior. The examinee must do something to demonstrate that they could perform a specific task in an actual system, if required to do so. These interactive exam questions provide some realism when compared against standard exam questions. For example, one or more screen shots of a tool, configuration window, or other administrative context may be displayed to provide context for the question. The user may then be asked to identify which parameter is set incorrectly. The user may identify the parameter by dragging and dropping a correct parameter setting to an answer box.

Alternatively, an image of the software window or tool of interest may be displayed and the user may be asked to point to the configuration setting which should be changed to accomplish a desired result. These types of interactive exam questions are referred to as "point-and-shoot" questions because the examinee uses a mouse or other pointer to indicate the field or other user interface control which must be modified to properly answer the question.

Alternatively, a conventional simulation may be used. Conventional simulations include a multi-media presentation of images and user interface controls which allow very limited interaction between the user and the simulation. These simulations may provide an interface which allows an examinee to navigate through a simulated software product to the proper location to resolve a problem described in an exam question. However, these simulations only provide user interface functionality for the menus, windows, and controls necessary to navigate to the proper software window to answer the question and to no other parts of the environment. Because the other menus, controls, and windows do not function, an examinee can find the proper screen or problem context quickly by simply using trial and error, at which point answering the question or performing a task may be trivial. Simulations executed by such simulations are often referred to as "closed" or "dumb" simulations because of the limited functionality and navigation paths.

In contrast, an "open" or "intelligent" simulation is one which realistically simulates a computer environment within which a simulation scenario takes place. The open simulation includes logic, rules, and processing ability which allows changes made by a user in the simulation to have a corresponding effect in the simulation. In addition, the open simulation matches the behavior of the actual components of the computer environment so that a user may take multiple navigation paths. Providing multiple navigation paths and ways to perform a task allows a user to truly "trouble shoot" a problem as will be expected in the actual computer environment. The user is free to investigate the simulated computer environment to solve a problem in a manner similar to real life.

Unfortunately, conventional simulators which provide limited openness in the simulations have other limitations. Generally, the data defining a simulation and/or computer environment is tightly integrated with the executable code of the simulators. Therefore, development and revisions to simulations is very expensive because this must be done by programmers instead of less expensive test item writers. The programmers modify the actual simulators to produce different simulations.

In addition, developing truly "open" simulators which simulate each feature, function, and aspect of an actual system is very time consuming, expensive, and complex. To shorten the development cycle and hold down costs, only certain features and functions of the actual system are simulated. Consequently, conventional simulations which are available provide only limited "openness".

These conventional simulations are often developed using multi-media development tools such as Shockwave or Flash products from Macromedia, of San Francisco, Calif. Generally, these tools provide limited flexibility. Each Shockwave or Flash application is programmed for a specific simulation exam question. The conventional simulation created is proprietary, customized, and specific. The training required to use these multi-media development tools generally limits their use to computer programmers. Any subsequent modifications to a simulation is done by the programmer. Using a programmer to develop or modify a conventional simulation increases simulation production costs.

Furthermore, these conventional simulations generally do not provide functionality for recording an examinee's response and/or interactions with the program. Conventional simulations are designed for presenting information, not monitoring an examinee's responses. Determining whether the examinee correctly resolved a problem presented is often rudimentary or non-existent. Typically, conventional simulations are equipped to provide a binary type of a score. The simulation indicates whether or not the user completed the entire simulation correctly or not.

Since simulations in certification exams are still relatively new, the industry has focused efforts on improving the simulations, and the simulators which present them, instead of evaluation technology for the simulations. However, as simulations become more mainstream, the industry's focus will likely shift to the simulation evaluation process to assist in distinguishing among the most qualified users who have 'passed' the exam. A simple passing score may no longer be sufficient.

Accordingly, what is needed is a system and method that overcomes the problems and disadvantages of the prior art. The system and method should simulate a computer environment, such that a user is provided with a realistic experience in configuring systems, trouble shooting and resolving problems. The system and method should provide a simulated computer environment which allows an author of a simulation to automatically define a set of possible tasks for the simulation by performing the tasks in the simulated computer environment. The system and method should provide a robust evaluation process for simulations. The system and method should provide an evaluation process which allows for partial scores and/or weighted scores to be awarded for performance in a simulation, as well as conventional binary scores. The system and method should provide an evaluation process which allows for re-scoring and simulation exam question seeding to improve the quality of the simulations developed.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
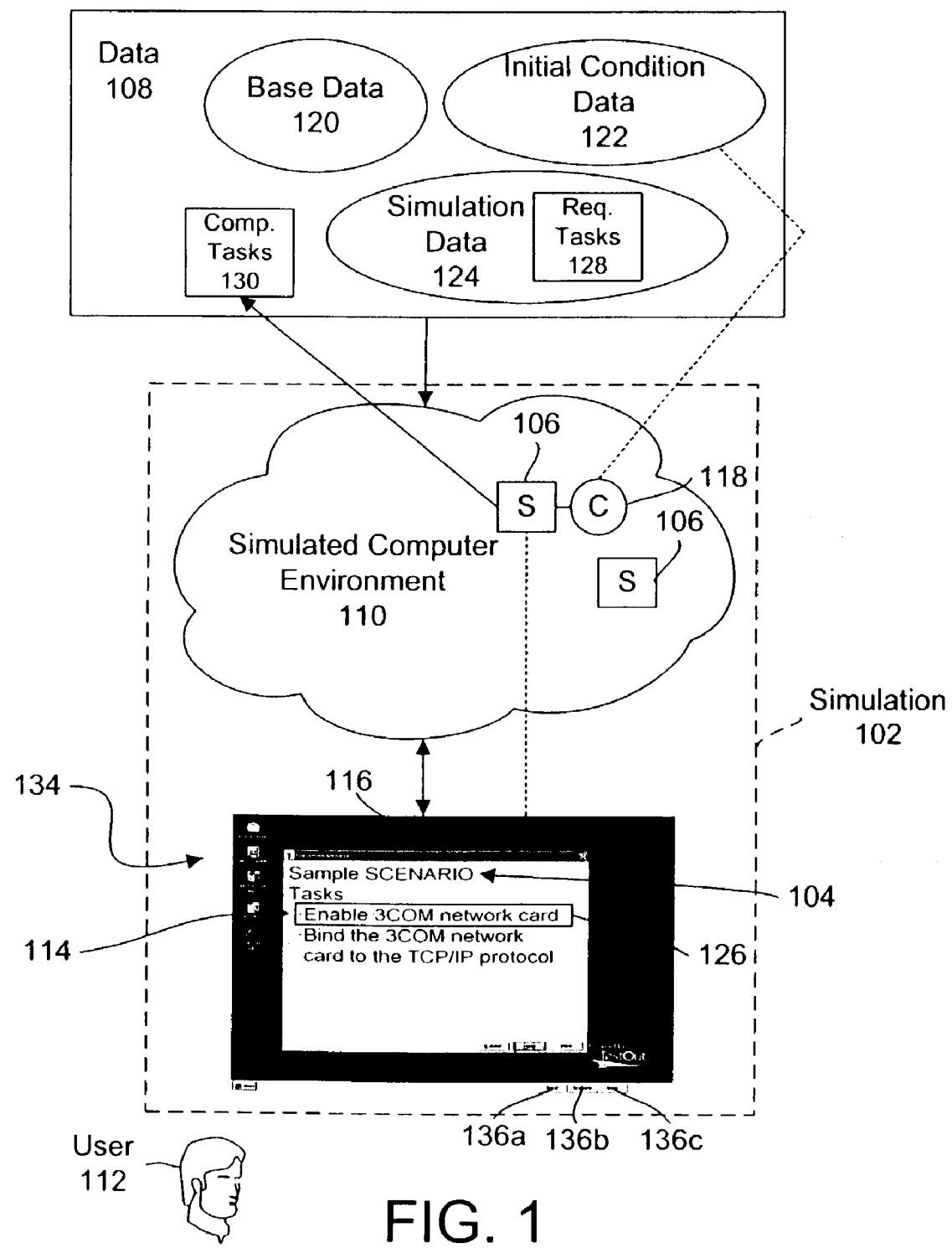
FIG. 1 is a logical relationship diagram illustrating components of one embodiment of the present invention.

The present invention relates to a system and method for simulating a computer environment and evaluating a user's performance within a simulation that addresses all of the above-identified problems and disadvantages.

In one embodiment, a set of base data which defines the simulated computer environment is read. The simulated computer environment includes a simulated component that emulates an actual component. Preferably, the base data is identifiably distinct and separately modifiable from computer-executable code used to simulate the computer environment. Base data may include hardware and/or software components. Initial condition data is also read. The initial condition data defines a modification for a characteristic of the simulated component defined by the base data. Of course, reading the base data and initial condition data may affect a plurality of simulated components, and/or characteristics.

Next, the simulated computer environment is represented by executing a simulator that simulates an actual software module of a hypothetical computer environment. The simulator manages the simulated component and modifies a characteristic of the simulated component using the initial condition data. In addition, a plurality of simulators which simulate actual software modules may be executed.

The system and method presents a simulation to a user using the simulator. The simulation includes a scenario having a set of tasks for the user to complete within the simulated computer environment. The scenario describes a situation or problem to the user. As the user interfaces with the simulator, tasks completed by the user are recorded.

Once the user has completed the simulation, the set of tasks which have been completed are evaluated to determine the user's performance within the simulation. The evaluation may include reviewing the set of required tasks, set of completed tasks, and evaluation criteria to determine a score for the simulation. The evaluation criteria may allow for a binary score to be awarded for the user's performance. Within this application, the term "binary score" means a score which has only one of two possible values, either full credit is awarded or no credit is awarded. A typical example of a binary score is a true-false question. In a simulation, a full credit binary score may mean that the user completed each of the required tasks correctly.

In certain embodiments, the evaluation criteria may allow for partial credit to be awarded for the user's performance. Alternatively, or in addition, each task may be associated with a variety of point values which effectively weight the tasks based on some criteria, for example, the author's perceived difficulty of the task.

Alternatively, an evaluation process may be provided which allows for the evaluation criteria, the set of required tasks, and/or the set of completed tasks to be modified subsequent to administering a certification exam comprising a simulation question. Then, a set of user completed tasks may be re-evaluated or re-scored to determine how the modification affects the user's scores.

In addition, the evaluation criteria may be defined such that certain simulations are not scored, or are awarded a no-score assessment. The no-score assessment may not affect the overall score for a user. However, the completed tasks may be compared with the required tasks for the simulation to determine what score a user would have earned had the simulation been awarded an actual score. In this manner, a simulation question may be included in a certification exam to test the quality of the simulation question itself.

In other embodiments, the system and method may include a simulation editor. The simulation editor allows for drafting of simulations. In response to a command from an author operating the simulation editor, a simulated computer environment is represented. As mentioned above, the simulated computer environment executes a simulator and reads base data to define a simulated component and simulate an actual software module of the hypothetical computer environment.

Tasks completed by the author are recorded and included in a set of available tasks which the author may select from to define required tasks. The set of available tasks are presented to the author within the simulation editor. An author's selection of at least one available task is received and the selected available task is converted into a required task for the simulation.

The present invention includes a simulation publishing system and method. The simulation may be defined in a single simulation file. Using publishing components, an author may package the base data, initial condition data, simulation file, and at least one simulator in a distribution file. The authenticity of the distribution file may be certified. The distribution file may then be stored on computer-readable media for presentation of the simulation within a certification exam.

The present invention presents a realistic simulation within a simulated computer environment. The simulated computer environment includes essentially the same features, functions, behavior, navigation paths, and user interface controls as an actual computer environment or a hypothetical computer environment. The present invention includes an evaluation process for the simulation which is robust and flexible. The present invention includes simulation editors which allow an author to develop a simulation by interacting with a simulated computer environment. The simulation editor is intuitive such that simulations using the simulated computer environment are quickly developed and revised without costly programmers.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, a block diagram illustrates logical relationships between components according to one embodiment of the present invention. In certification exams, a simulation 102 of an IT scenario 104 for teaching and measuring a user's proficiency is preferred over conventional exam questions.

Conventionally, those most qualified to author these simulations 102 were computer programmers. Often, a computer program such as a shockwave multi-media presentation is written to simulate actual computer components and/or software. However, as certification exams have advanced and become more specialized, those most qualified to author a simulation 102 have become exam test item writers. These are individuals trained in writing exam questions both conventional and simulation based. Therefore, authoring or modifying conventional simulations required collaboration between an exam test item writer and a computer programmer. This duplicate effort is expensive.

As shown in FIG. 1, one or more simulators 106 implement a simulation 102, discussed more fully below. The simulation 102 includes a scenario 104 which describes the problem or issue to be resolved. For example, generally the phrase "Sample SCENARIO" is replaced by one or more paragraphs describing a technical situation a user must resolve.

Preferably, the simulators 106 are separate and distinct from data 108 used by the simulators 106. By separating the data 108 from the simulators 106 which implement the simulation 102, a computer programmer is only required to initially define the simulators 106. However, an exam test item writer may define and refine the data 108 to generate a simulated computer environment 110 which presents different simulations 102 to a user 112. Thus, the simulators 106 which implement the simulated computer environment 110 are reused while the data 108 is changed as needed. Preferably, the simulated computer environment 110 represents a hypothetical computer environment which may or may not actually exist.

Generally, each simulation 102 presents a single question to an user 112, an examinee, during a certification exam. Of course, the same simulation 102 may be used to teach an IT concept, present a simulated certification exam, or illustrate a concept to the user 112.

Preferably, the simulation 102 presents a scenario 104 to provide context for the simulation 102. The scenario 104 describes a problem or question a user 112 is to resolve. The scenario 104 may also describe the simulated computer environment 110. Preferably, the scenario 104 includes a set of tasks 114 which tell a user what to do to address the item being examined. However, the tasks 114 generally do not indicate how to perform each task 114. The tasks 114 are descriptions of steps, or operations, a user must complete in the simulated computer environment 110 in order to successfully complete the simulation 102. The tasks 114 may be unordered and unrelated. Alternatively, the tasks 114 may be sequential with each task 114 altering the simulated computer environment 110 in some manner in preparation for the following task 114. The tasks 114 and scenario 104 may be described in a simulation window 116, described in more detail below.

Alternatively, the user 112 is left to discover the context of the simulated computer environment 110 on his/her own. This context has conventionally been difficult to present to an IT examinee using conventional exam questions. The simulated computer environment 110 presents the context in substantially the same manner as a user 112 would experience with the actual computer environment. Specifically, the user 112 must interact with the environment 110 to discover the context.

The simulation window 116 may display when a simulation 102 first starts. A user 112 may close the simulation window 116, if desired. The simulation window 116 may include a button for soliciting help, a button for printing the scenario description 104 and listed tasks 114, and a button for displaying an exhibit (not shown). An exhibit may display a graphic image which further aides in providing context to the user 112 for the particular simulation 102. Of course different buttons of the simulation window 116 may be invisible or unavailable when the simulation 102 is used in a certification exam. Alternatively, additional buttons may be provided in a certification exam which are not present when the simulation 102 executes in a training package.

Referring still to FIG. 1, the simulators 106 provide a framework for the data 108 which defines the simulated computer environment 110. Preferably, a plurality of simulators 106 are used to simulate the simulated computer environment 110. Alternatively, a single simulator 106 may be used. Initially, a single simulator 106 may be executing. From the initial simulator 106, a user 112 may execute one or more additional simulators 106. The simulated computer environment 110 may represent an actual personal computer, one or more computers connected on a network, an operating system, a computer application, or the like.

In another alternative, the simulated computer environment 110 represents a hypothetical computer environment. The hypothetical computer environment may, or may not, actually exist. The size and scope of the simulated computer environment 110 depends on the base data, described in more detail below, and the purpose for the simulation 102. While a simulated computer environment 110 may include simulators 106 which emulate hardware or software, in a preferred embodiment, the simulators 106 emulate actual software modules of the hypothetical computer environment. In this manner, a user 112 gains experience in the simulation 102 which is transferable to actual software modules in an actual computer environment.

Conventionally, in order for a student or examinee to test his or her IT proficiency, the student accesses a lab of actual computers on an actual network. The network is configured especially for the user to practice or prove their skills. However, such labs are expensive and generally allow only one user to fully test his/her skills at any one time. In addition, changes made by one user modify the lab environment such that a second user may not be able to concurrently use the lab. In contrast, embodiments of the present invention allow many users to test their skills within a simulated computer environment 110 of almost any size.

Generally, the simulators 106 are executable software code compiled for an all-purpose computer. Of course, the simulators 106 may also be interpreted code, byte code, or the like. A simulator 106 provides the logic, rules, features, functionality, and processing ability which emulates actual software and/or hardware of an actual computer environment.

Preferably, the simulators 106 are identifiably distinct from each other in the form of separate computer-executable code (i.e., separate executables). However, during execution of the simulators 106, the simulators 106 interact with each other to provide an appearance of one single simulator to a user 112. The distinct simulators 106 cooperate to simulate the computer environment 110. Alternatively, the simulators 106 may be integrated in one single set of computer-executable code.

The simulated computer environment 110 includes one or more simulated components 118. A simulated component 118 is a representation of an actual hardware and/or software component in a software and/or computer system. Preferably, simulated components 118 are implemented using software objects. The simulated component 118 includes data which defines the attributes, features, functions, and operational status of an actual component. For example, a simulated component 118 of a hard drive may include the manufacturer name, date installed, whether the drive is external or internal, a version identifier, and a listing of the drivers which provide access to the drive.

Of course, other attributes, features, and functions may be included in the simulated component 118. Data which defines the attributes, features, functions, and operational status of a simulated component 118 is referred to as a characteristic (not shown). A characteristic may also define sub-components of a simulated component 118. The sub-components are typically components of an actual system which do not allow functional interaction with a user. For example, a software DLL (Dynamic Link Library) sub-component may be represented by one or more characteristics which display the status of an installed DLL file.

In one embodiment, a simulator 106 is executed and associated with a simulated component 118. Preferably, the simulator 106 simulates a software application commonly found in a conventional computer environment. The simulator 106 may simulate any software application of a computer environment.

In one example, the simulator 106 simulates a windows file explorer application. The simulator 106 may be associated with one or more "files" which are implemented through simulated components 118. Alternatively, a simulator 106 may simulate a hardware component of an actual computer environment.

In certain embodiments, data 108 comprises a collection of base data 120, initial condition data 122, and simulation data 124. Base data 120 defines the simulated components 118. Base data 120 is data which also defines the characteristics of simulated components 118 which are associated with one or more simulators 106. The base data 120 comprises the values which make the simulated component 118 in the simulated computer environment 110 realistic.

For example, a simulator 106 may define functionality which emulates a personal computer connected to a network. However, the base data 120 defines the name of the computer, the IP address for the computer, the number of disk drives present in the computer, the various networking protocols supported by the computer and other such information. In addition, the base data 120 may also define three, four, or twenty computers which use the same simulator 106 but represent different computers on a network in the simulated computer environment 110.

Preferably, the base data 120 includes data for a plurality of simulated components 118 which exist in the simulated computer environment 110. The base data 120 defines the simulated components 118 such that all the components 118 inter-operate normally. In other words, the simulated computer environment 110 functions in a similar manner to an actual or hypothetical operational computer environment being simulated.

The initial condition data 122 is data which modifies one or more characteristics of one or more simulated components 118 defined by the base data 120 (as indicated by a dashed line from initial condition data 122 to a simulated component 118). The initial condition data 122 allows for certain simulated components 118 in the simulated computer environment 110 to be rendered unusable, missing, improperly configured, malfunctioning, or the like. Generally, the initial condition data 122 modifies the simulated computer environment 110 from one which functions properly to one which requires troubleshooting, maintenance, or other skills of an IT professional. The initial condition data 122 may also be used to define new simulated components 118 or remove simulated components 118 which were defined in the base data 120.

By accessing the base data 120 and modifying the base data 120 with initial condition data 122, a simulated computer environment 110 is defined for use in simulation-based exam questions. Generally, a simulation-based exam question includes a scenario 104. Data 108 such as text describing a scenario 104 and other aspects of the simulation 102 are stored as simulation data 124.

Generally, a task 114 comprises a task description 126 and a task definition which is stored with the data 108. The task description 126 is a textual description of a task the user 112 is to complete. In certain embodiments, the task description 126 may be embodied as an audio or video clip.

Figure 4:
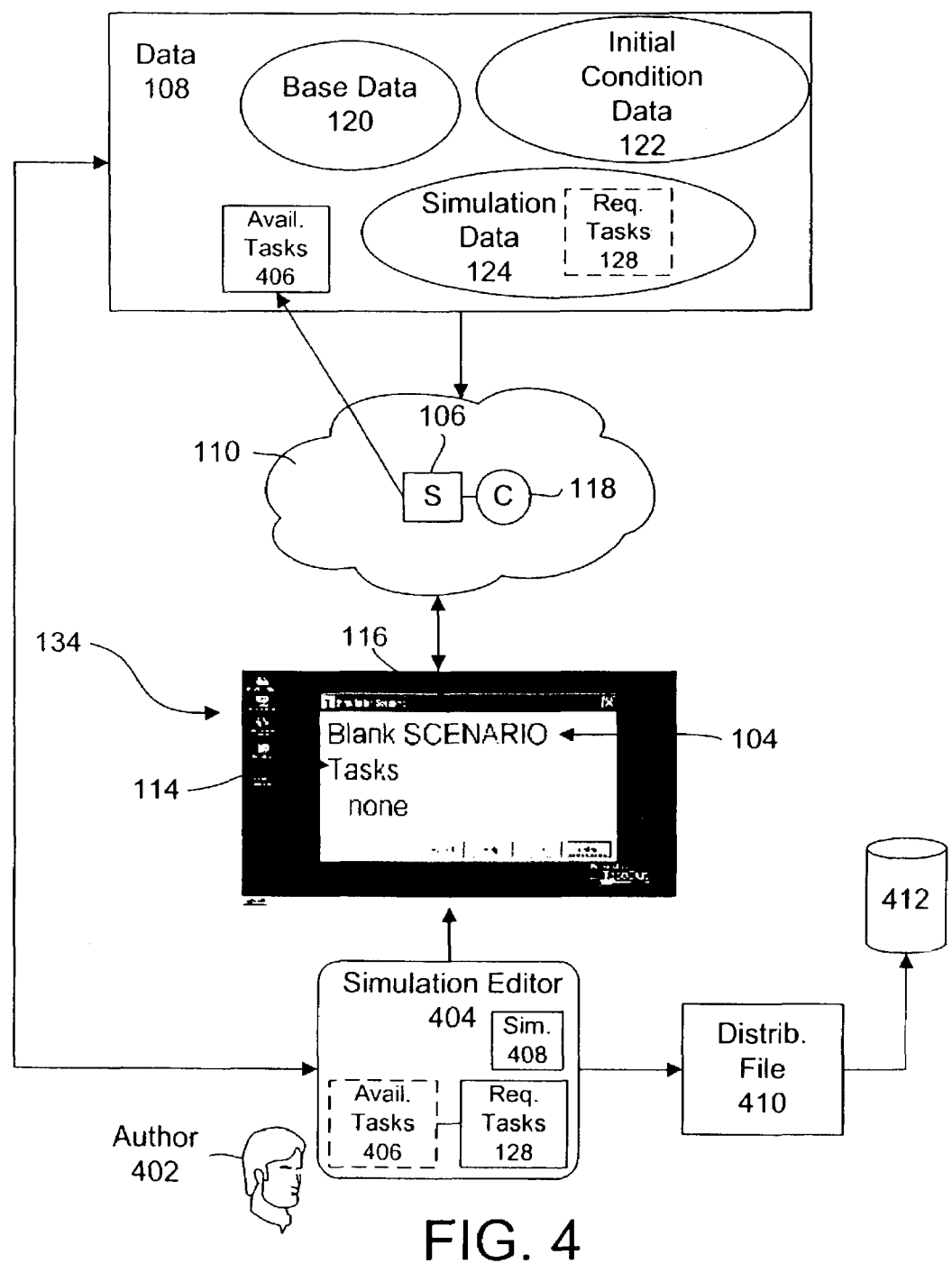
FIG. 4 is a block diagram illustrating one embodiment of the present invention in which an author interacts with the simulated computer environment to define a set of available tasks which may be used to develop a simulation.

A task definition may be one of three types, a required task 128, a completed task 130, or an available task (Illustrated in FIG. 4 and discussed in relation thereto). A task definition defines the task 114 in a computer-readable format. In one embodiment, a task 114 is defined by a key-answer pair (not shown).

Of course, those of skill in the art recognize that the task definition may be implemented using various computer-readable formats. For example, a multi-dimensional array, queue, or linked list may be used to define what actions of a user 112 correspond to completion of a task 114 in the simulated computer environment 110. In one embodiment, for certain actions in the simulated computer environment 110 a simulator 106 may send a unique message indicating a certain action was taken. The message may include what characteristic, if any, was modified and the new value. The messages may be collected in a central location for comparison with required tasks 128.

In a key-answer pair implementation, the key may be a unique identifier of name-value pairs which are concatenated to form the key. A key uniquely identifies the task 114. The key-answer pair may comprise textual data. The name-value pairs indicate which components within the simulated computer environment 110 have been visited or changed, or which actions have been performed. For example, certain name-value pairs may identify the computer, the user 112 who accessed the computer, the administration tool used, the window opened, and the characteristic which should be modified if the user 112 properly completes the task 114.

The answer portion indicates what the end result for a characteristic is to be when the task 114 is completed properly. For example, if the task description 126 is to "Enable 3COM network card", the key might be "Computer=Wrk1 &Installed Network Card&3COM&enabled" and the answer might be "Yes".

Typically, all tasks 114 associated with a simulation 102 are required tasks 128. The required tasks 128 must be performed by a user 112 in order to successfully complete the simulation 102. The required tasks 128 measure a user's ability to perform certain operations.

In addition to required tasks 128, a simulation 102 may include optional tasks (not shown) and/or bonus tasks (not shown). Optional tasks may test or teach more advanced tasks involving the simulated computer environment 110. A bonus task may provide an opportunity to score points in a simulation 102 above and beyond those available with the required tasks 128. Points for a bonus task may supplement points lost by not performing one or more required tasks 128.

As the user 112 interacts with the simulated computer environment 110, the interactions are recorded. Preferably, the interactions are recorded as completed tasks 130. A completed task 130 may be recorded for each use, control, or modification of a component 118, characteristic of a component 118, or action within a software module (not shown) simulated by a simulator 106. The completed tasks 130 may be stored with the data 108 for use later in evaluating a user's performance. Of course, because the simulation 102 is "open", a user 112 may interact with almost any components 118 and/or software module (simulator 106) in the simulated computer environment 110. Therefore, the set of completed tasks 130 may be larger than the set of required tasks 128.

Generally, the interactions are user interface types of actions. Actions such as selecting a tab, button, window, edit box, toggling a radio button or spin dial, and modifying an edit box, are the kinds of actions which may be recorded as completed tasks 130. Other functional actions such as installing a software driver, changing an access password, and the like are also interactions which may be recorded as completed tasks 130.

The level of interaction between a user 112 and the simulation 102 which registers a completed task 130 may vary depending on how the present invention is implemented. In certain embodiments, the kinds of tasks 114 which are recorded are pre-defined. In other embodiments, a test item writer may be permitted to select the level of interaction which will be recorded.

The granularity of interactions which are recorded may depend on the purpose of the simulation 102. At one extreme, each button click, window selection, and user action may be recorded. At the other extreme, only actions which a test item writer deems significant may be recorded.

A user interface 134 is provided to allow the user 112 to interact with the simulation 102. Preferably, to provide more realistic simulations 102, the user interface 134 is substantially identical to an actual user interface the user 112 would interact with to control and manipulate an actual computer environment. For example, the user interface controls, windows, error messages, pop-up windows, and navigation of the user interface 134 may function substantially the same as an actual computer interface which a user 112 would use.

Generally, the user interface 134 emulates the main tool or software technology being taught or tested for a certification exam. In one embodiment, the user interface 134 emulates a user interface for one of the Windows® family of operating systems. Alternatively, the user interface 134 may emulate other operating systems such as LINUX, UNIX, MAC, and the like.

In another embodiment, the user interface 134 may emulate a frame of reference which is common among those skilled in working with the IT being taught or tested. For example, IT technicians generally control and manage routers using a terminal window. The type of operating system is not relevant to use of the terminal. Therefore, rather than emulating an operating system, a network map illustrating routers communicating on a network in the simulated computer environment 110 may be provided from which simulated terminal windows may be launched to configure and control the routers in the network map. A network map is one example of a common frame of reference understood by those who manage routers. Because the user interface 134 is separate from the data and simulators 106, the user interface 134 may be changed to present a user interface 134 corresponding to a common frame of reference or an actual user interface associated with IT concepts being tested.

The user interface 134 may include one or more control buttons 136a–c. The control buttons 136a–c allow a user 112 to control operation of the simulation 102. In the depicted embodiment, the control buttons 136a–c are integrated with a main navigation bar of the user interface 134. In embodiments in which the simulation 102 is integrated with a certification exam, the user interface 134 may include exam question navigation buttons (not shown) such as "forward", "back", "beginning", and "end." These buttons allow the user 112 to move between exam questions and simulations 102 of a certification exam.

A "Reset" button 136a allows the user 112 to return the simulation 102 to the same condition which existed when the simulation 102 was first started. Generally, activating the "Reset" button 136a reverts any modifications made in the simulated computer environment 110 to the condition of the simulation 102 before any changes were made. A "Scenario" control button 136b displays the simulation window 116 which allows the user 112 to review the scenario description 104 and tasks 114. A "Done" control button 136c stops the simulators 106, stops the simulation 102, and closes the user interface 134. In certain embodiments, activating the "Done" button 136c may also initiate an evaluation process which includes scoring and/or reporting how well a user 112 performed the tasks 114.

Figure 2:
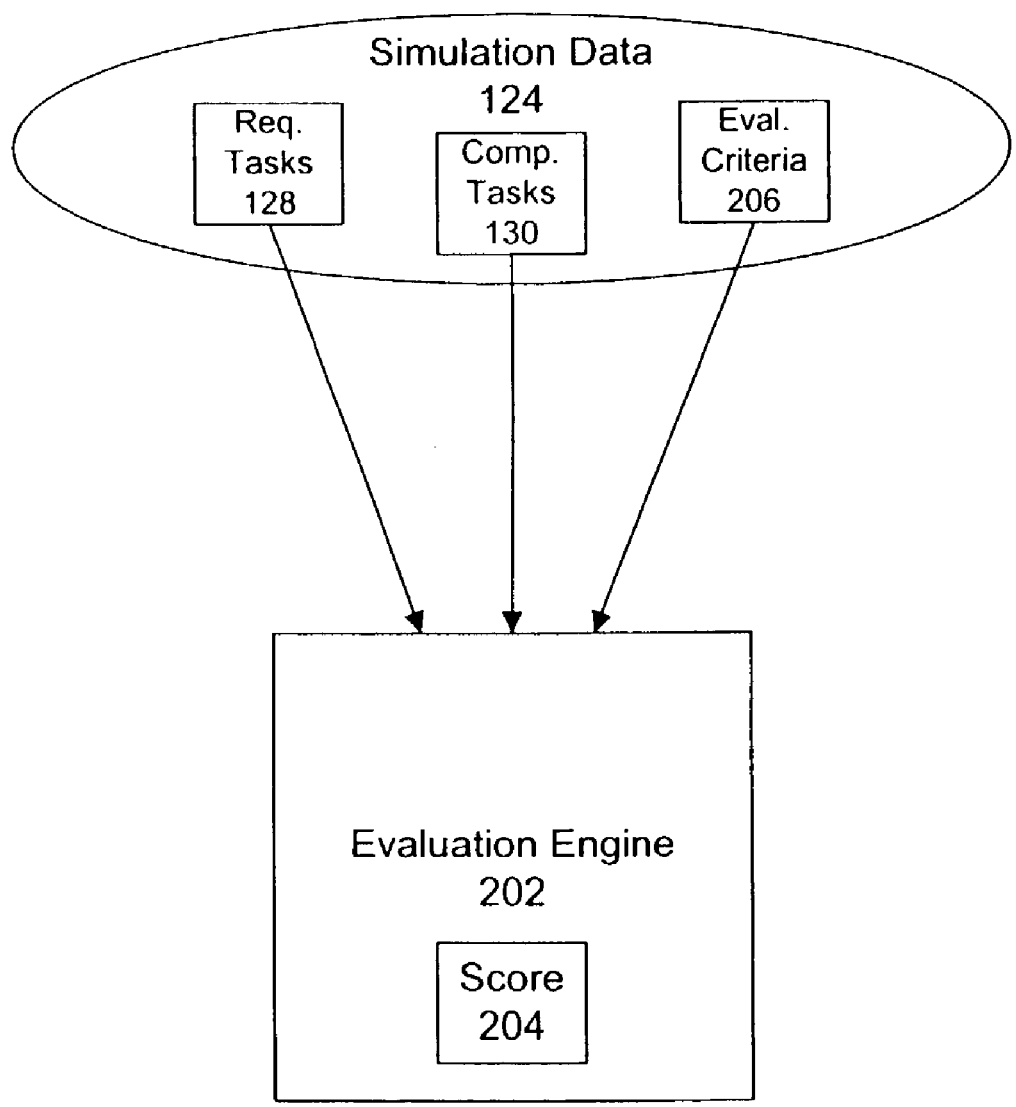
FIG. 2 is a block diagram illustrating components used to evaluate a user's performance within a simulation.

Referring now to FIG. 2, when a user 112 finishes the simulation 102, typically by activating the "Done" button 136, an evaluation engine 202 is activated. The evaluation engine 202 is preferably a set of computer-executable code which executes an evaluation algorithm (not shown) for the simulation 102 (See FIG. 1). Preferably, the evaluation engine 202 is capable of evaluating almost any simulation 102. This flexibility is possible because the evaluation engine 202 is separate from simulation data 124. The simulation data 124 provides input data for an evaluation process. The evaluation engine 202 may execute locally on a user's 112 machine. Alternatively, the evaluation engine 202 may execute as a server (not shown) which provides evaluations for a number of simulations 102 across a computer network.

The evaluation engine 202 reviews the completed tasks 130, required tasks 128 and evaluation criteria 206 which are associated with a specific simulation 102. Based on these three sets of data, the evaluation engine 202 uses an evaluation algorithm to determine the score 204. Generally, the evaluation algorithm is a simple comparison of the required tasks 128 with the completed tasks 130. Each required task 128 which has a corresponding completed task 130 is awarded an associated score 204. Of course, more complex evaluation algorithms may be implemented by the evaluation engine 202. The score 204 represents how well a user 112 performed the required tasks 128 of a particular simulation 102.

Completed tasks 130 may be stored in simulation data 124 which is associated with a particular user 112 (See FIG. 1) and simulation 102. Of course, the completed tasks 130 may be stored separate from the simulation data 124. The simulation data 124 may be stored in any computer-readable format desired. For example, in one embodiment, the completed tasks 130, required tasks 128, and evaluation criteria 206 are stored in separate files within a common hard drive directory, which is associated with the user 112. Of course, various other storage and organization methods may be used. For example, the simulation data 124 may be stored in a database, an object in volatile memory of a computer, or the like.

The evaluation criteria 206 determines how the evaluation engine 202 evaluates the required tasks 128 and completed tasks 130 to determine the score 204. In the depicted embodiment, the evaluation criteria 206 is separate from the required tasks 128 and completed tasks 130. Alternatively, the evaluation criteria 206 may be integrated with each of the completed tasks 130. Preferably, a test item writer may define the evaluation criteria 206 to implement any of the following scoring methods for the simulation 102.

In one scoring method, the evaluation criteria 206 is such that a binary score 204 is awarded. When each required task 128 matches a completed task 130 within the set of completed tasks 130, a full credit score 204 is awarded. Full credit may be represented by a boolean value such as true or false, pass or fail, or some point value which is equal to the maximum allowed for the simulation 102. If any required task 128 does not include a corresponding completed task 130, then no credit is awarded as the score 204 for the user's performance on the simulation 102.

In an alternate scoring method, the evaluation criteria 206 comprises a single point value which is assigned to each of the required tasks 128. Under this scoring method, when less than all of the required tasks 128 match completed tasks 130, a partial credit score 204 is awarded. For example, if only seven completed tasks 130 match of ten required tasks 130, the score 204 may be a partial score of 7 points, or seventy percent.

In yet another scoring method, the evaluation criteria 206 comprises a variety of point values. Each of the required tasks 128 is assigned one of the point values. Certain required tasks 128 may be assigned the same point value. Alternatively, each required task 128 may be assigned a different point value. Under this scoring method, when less than all of the required tasks 128 match completed tasks 130, a partial credit score 204 is awarded.

For example, suppose three required tasks 128 are assigned a twenty point value, and seven required tasks 128 are assigned a ten point value. If only the three twenty point required tasks 128 match completed tasks 130, the score 204 may be a partial score of sixty of the one-hundred and thirty possible. In this manner, certain required tasks 128 may be weighted more heavily than others. The weights may be represented by the different point values. The weights may be assigned based on the difficulty or complexity of the required task 128. Higher weights may be assigned to more difficult tasks 128 to reward users 112 who complete those tasks 128. Alternatively, more difficult tasks 128 may be assigned lower point values to decrease the negative impact of not completing those tasks 128.

In another embodiment, tasks 128 for a first simulation 102 may be weighted more heavily than tasks 128 for a second simulation 102. Thus, each simulation 102 may be weighted with respect to each other. Consequently, the simulation 102 as a whole may be weighted with respect to other questions in a certification exam.

In certain embodiments, the simulation 102 may be incorporated into a certification exam. In one aspect, the evaluation criteria may include a no-score assessment. A no-score assessment is an evaluation of the user's 112 performance as described in relation to FIG. 2. However, the score 204 which is determined, has no affect on the user's overall score (not shown) for the certification exam.

Often, question sets for standardized exams, such as a certification exam, include one or more 'seed' questions. A seed question is one which is intended for use in a future exam. The seed question is placed in a current actual exam, such that the performance of the examinees, with regard to this seed question, may be evaluated. If the examinees' performance on the seed question reflects a normal distribution, the seed question may be determined to be acceptable. However, because there is a risk that the seed question may improperly skew the exam results, it is desirable that the score for the seed question have no affect on the examinees' overall scores. A no-score assessment for a simulation 102 allows a test item writer to 'test' how effectively the simulation 102 accomplishes its purpose in testing a user 112 for a particular skill. The simulation 102 may be placed in an exam as a 'seed' simulation-based question.

The evaluation engine 202 coupled with the simulation data 124 offers a powerful analysis tool for test item writers (shown in FIG. 4 as an author). The simulation data 124 may represent data from a previous certification exam, a recent certification exam, or a sample of synthetic data generated by an algorithm. Therefore, simulation data 124 which is associated with a particular user 112, simulation 102, and/or certification exam may be used to "score" the user 112 again. The process of re-evaluating simulation data 124 which has been modified in any way is called re-scoring. A score assigned after re-scoring is called a re-score (not shown).

The simulation data 124 may be re-scored for many reasons, all of which are considered within the scope of the present invention. In one embodiment, the test item writer may learn that a simulation 102 grossly skews the results of a certification exam. Therefore, the test item writer, or other certification exam administrator, may edit the required tasks 128 after a user has received a score 204. Specifically, depending on whether the simulation 102 is skewed towards no-credit or full-credit, a required task 128 may be removed or added to the set of required tasks 128. For example, suppose the simulation 102 resulted in almost no examinees being awarded full credit. A test item writer may remove a particularly difficult required task 128. The simulation data 124 may then be re-scored to determine new scores 204 which are not skewed.

Alternatively, a test item writer may want to learn how a recently developed simulation 102 may influence examinee's scores 204 in a future exam. Therefore, the test item writer may take simulation data 124 for a similar simulation 102, and replace the required tasks 128 with a new set of required tasks 128. The simulation data 124 for an examinee may then be re-scored to evaluate differences caused by the new set of required tasks 128. Of course, such re-scoring may be done with a plurality of sets of simulation data 124 to derive statistically significant results. In addition, a test item writer may also modify the set of completed tasks 130 and/or the evaluation criteria 206 before re-scoring the simulation data 124.

Figure 3:
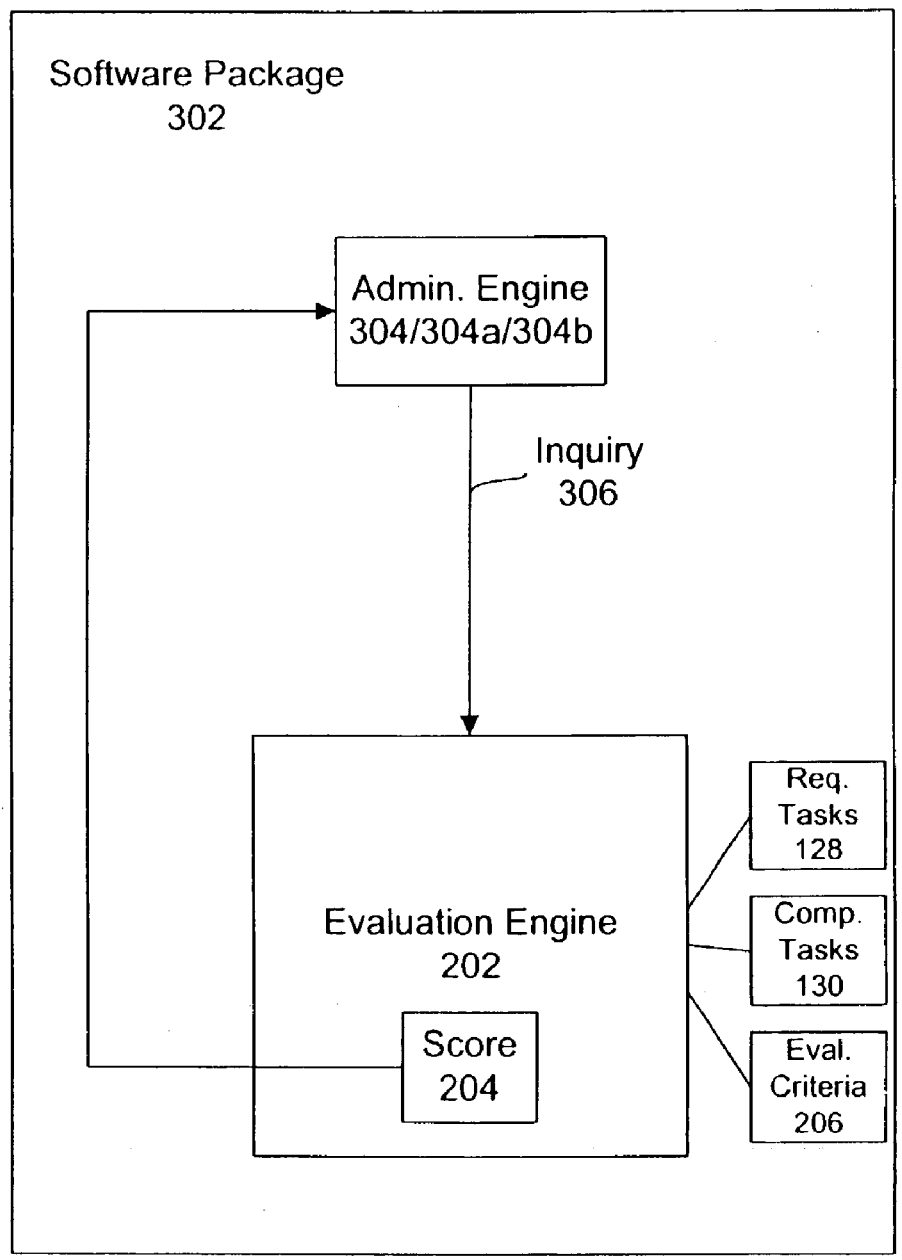
FIG. 3 is a block diagram illustrating components used to evaluate a user's performance within a simulation which is incorporated into a software package.

Referring now to FIG. 3, preferably, a simulation 102 is incorporated in a single software package 302. The software package 302 may be any software application within which it is desirable to present simulations 102. For example, the software package 302 may be software used to administer a certification exam, particularly an IT certification exam.

Typically, the certification exam is administered electronically through a software package 302. The software package 302 may execute on a separate computer for each examinee. Alternatively, the software package 302 may have a client-server architecture. The clients operate on the user's computer, and a main server manages the certification exam, serves questions to the clients, and manages scoring of the exam. Examples of typical software packages 302 include software products from Prometric of Baltimore, Md. and VUE of Bloomington, Minn. These packages 302 are commonly referred to as exam drivers or a testing harness.

Software packages 302 typically include an administration engine 304 which controls the flow of operation for the software package 302. The administration engine 304 may respond based on input from the user 112 (See FIG. 1). Alternatively, the administration engine 304 may operate automatically after being initiated by a proctor (not shown) of an exam.

In one embodiment, the software package 302 is a certification exam. The software package 302 includes an administration engine 304 which is a certification exam engine 304a. Of course, the certification exam engine 304a may be separate or integrated with the software package 302. The certification exam engine 304a may respond to input from a proctor which begins a certification exam. The certification exam engine 304a may keep official time for the exam, record user's answers to questions, initiate simulations 102 (See FIG. 1), and attend to various other functions for administering and proctoring a certification exam.

Included in the various functions for the certification exam engine 304a, is determining a score 204 for simulations 102 of the certification exam. In the depicted embodiment, the evaluation engine 202 is configured to provide a score 204 for a simulation 102 in response to a score inquiry 306. The certification exam engine 304a may issue the score inquiry 306 at any time after a simulation 102 is completed by a user 112 (See FIG. 1). The score inquiry 306 preferably identifies the simulation 102 for which a score 204 is being requested.

The evaluation engine 202 receives the score inquiry 306 from the certification exam engine 304a. The evaluation engine 202 then reviews the set of required tasks 128, set of completed tasks 130, and evaluation criteria 206 for the indicated simulation 102 to determine a score 204. The score 204 represents an evaluation of the user's performance within the simulation 102.

Next, the evaluation engine 202 reports the score 204 to the certification exam engine 304a. The score 204 may be communicated in any format which is readable by the certification exam engine 304a. The score 204 may include a type indicator (not shown) which identifies the score 204 as a partial score, a no-score assessment, re-score, or a binary score.

The evaluation engine 202 and certification exam engine 304a may communicate within a single computer using windows messages. Alternatively, the evaluation engine 202 and certification exam engine 304a may communicate across a computer network (not shown) such as a LAN (Local Area Network), or the Internet. The inquiry 306 and score 204 may be exchanged using conventional inter-application communication protocols including TCP/IP (Transmission Control Protocol/Internet Protocol).

In certain embodiments, when the evaluation engine 202 is programmed to respond to score inquiries 306, simulations 102 which include the evaluation engine 202 may readily be utilized as active exhibits (not shown). An active exhibit is a simulation 102 which does not provide a score for the user's 112 performance within the simulation 102. Instead, a standard exam question associated with the simulation 102 provides the score. The standard exam question may be a multiple choice question. The user 112 interacts with the active exhibit to determine the correct answer to the standard exam question.

Of course, implementing a simulation 102 as an active exhibit may be accomplished in a variety of ways. For example, a simulation 102 may operate as a simulation-based question in which no evaluation is performed unless a score 204 is requested. Then, a certification exam engine 304a may simply not request a score 204 from the active exhibit simulation 102. Instead, the certification exam engine 304a may query the standard exam question or another module for a score 204.

In an alternative embodiment, the software package 302 is a training module. For example, the software package 302 may comprise a training suite for use by a student (not shown) in preparing for a certification exam, or as an educational tool to enhance IT skills. In this embodiment, the administration engine 304 comprises a training engine 304b.

The training engine 304b may execute simulations 102 for a user 112 (See FIG. 1). The training engine 304b may also present more standard types of IT questions to prepare a user 112 to pass a certification exam. In addition, the training engine 304b may provide help or technical information to assist with the learning of the user 112.

In certain embodiments, the training engine 304b may cooperate with the evaluation engine 202 to provide feedback (not shown) to a user 112 once a simulation 102 is completed. The feedback may be provided in the form of a score 204 which is substantially the same as a score 204 for an actual simulation 102 in a certification exam. Alternatively, the feedback may indicate which required tasks 128 were not completed and/or offer suggestions on how the user 112 might improve his or her performance.

As mentioned above, the score 204 may be determined in response to a score inquiry 306 from the training engine 304b. The feedback may be provided automatically when a simulation 102 is ended. Alternatively, a configuration setting of the software package 302 may determine whether feedback is provided.

While the evaluation engine 202 responds to score inquiries 306 in the embodiments depicted in FIG. 3, those of skill in the art recognize that the evaluation engine 202 may determine a score 204 based on a variety of factors. In one embodiment, the evaluation engine 202 automatically determines the score 204 and stores the score 204 on computer-readable media. Alternatively, the automatically determined score 204 may be transmitted to a server (not shown) or central location.

In yet another alternative, rather than determining a single score 204 in response to a single score inquiry 306, a plurality of scores 204 may be determined for a plurality of simulations 102 in response to a single score inquiry 306. For example, in a certification exam, the certification exam engine 304a may send a single score inquiry 306. The evaluation engine 202 may then determine a score 204 for a batch of simulations 102. The simulations 102 may be identified by the score inquiry 306. Alternatively, the evaluation criteria 206 may include indicators of all the simulations 102 presented within a certification exam.

Referring now generally to FIG. 1 and specifically to FIG. 4, in the depicted embodiment, an author 402 may interact with the simulated computer environment 110 to define a simulation 102. A simulation editor 404 is provided which allows the author 402 to define simulation data 124 for a simulation 102.

The simulation editor 404 allows the author 402 to enter a textual description for the scenario 104. Alternatively, an audio clip may be recorded which describes the scenario 104. The simulation editor 404 may also designate a computer in the simulated computer environment 110 to be associated with the user interface 134. Preferably, the simulation editor 404 records this information as simulation data 124.

In certain simulations 102, the author 402 may configure the user interface 134. For example, an author 402 may want the user 112 to begin with a specific administration tool window open. Alternatively, rather than allow a user 112 to access various other tools in the simulated computer environment 110, an author 402 may restrict the user 112 to use of one tool. Of course, various other changes to the configuration of the simulated computer environment 110 may be made. Preferably, configuration information for the user interface 134 is also stored in the simulation data 124.

Conventionally, the simulation data 124 is integrated with computer-executable code for presenting a simulation. Therefore, defining the simulation data 124 requires editing the computer source code. Alternatively, an author 402 may be able to edit a configuration file such as an .ini file to define and revise a simulation. However, defining required tasks 128, or their functional equivalents, in conventional simulations, generally requires a computer programmer.

In contrast, in the depicted embodiment, an author 402 may define required tasks 128 by performing tasks within the simulated computer environment 110. Because the data 108 is separate from simulators 106, certain operations performed by an author 402 may be used to define or revise data 108. The author 402 is able to use the simulated computer environment 110 in the same manner as the author 402 would use an actual computer environment. Consequently, performing tasks within the simulated computer environment 110 is intuitive and natural for the author 402.

Thus, an author 402 can quickly define and revise a simulation 102 (See FIG. 1) with minimal training and minimal effort.

To draft a simulation 102, the author 402 begins by executing a simulation editor 404. Within the simulation editor 404, an author 402 may issue a command which causes base data 120 to be read to define a simulated computer environment 110. Next, the simulated computer environment 110 is represented by executing at least one simulator 106 as described in relation to FIG. 1 above. The simulator 106 simulates an actual software module of the hypothetical computer environment. The simulator 106 may include a simulated component 118 that emulates the operation and configuration of an actual component within a computer environment.

One simulator 106 may be designated as the initial simulator 106 to interact with a user 112 or author 402. The designation may be set within the base data 120 or simulation data 124. Alternatively, the initial simulator 106 may be designated by default. For example, in a simulated computer environment 110 for a personal computer or workstation, the default initial simulator 106 may be a simulator 106 which simulates a popular operating system by default.

The initial simulator 106 presents a user interface 134. A simulation window 116 may be displayed. Because a simulation 102 is in the process of being defined, the simulation window 116 may display default information for the scenario 104 and descriptions of the tasks 114.

At this point, the author 402 is free to interact with the simulated computer environment 110 in the same manner as he or she would in an actual computer environment. The author 402 may launch simulated administration tools (not shown) and perform tasks or operations using those administration tools.

The simulated administration tools allow interaction with simulated components 118 which represent actual hardware devices and/or software modules. Administration tools for managing files, hardware devices, network connections, application services, and the like, allow an author 402 to perform any number of tasks 114.

However, certain aspects of the simulated computer environment 110 can not be modified using simulated system administration tools because the corresponding actual administration tools do not include the necessary functionality. In particular, when a new physical hardware device or whole computer system is to be added to the hypothetical computer environment, no administration tools exist for creating it because the physical device or computer must physically exist.

To define components 118 which are not definable using administration tools, a base data editor (not shown) is provided. The base data editor may be executable from, or integrated with, the simulation editor 404. Alternatively, when an author 402 executes the simulated computer environment 110, the base data editor may be made available to the author 402.

Preferably, the base data 120 defines a default operational computer environment, such as a single computer and the devices associated with the computer or a standard LAN (Local Area Network) having a file server, a print server, an email server, and three connected workstations. In one alternative embodiment, basic default data (not shown) may be integrated with each simulator 106 such that base data 120 need not be read to define the simulated computer environment 110.

As an author 402 completes tasks by using at least one simulator 106, the completed tasks 130 are recorded in data 108 as a set of available tasks 406. These tasks 406 may include defining any simulated components 118 which are normally definable using actual administration tools. These available tasks 406 are preferably recorded and formatted in a similar manner to completed tasks 130 (See FIG. 2) performed by a user 112. The tasks 406 may include adding or removing components 118, enabling or disabling the component 118, and the like.

In addition, an author 402 may review properties and configuration settings (not shown) for simulated components 118 just as with actual components in an actual computer system. The available tasks 406 may include at least one task 406 which modifies at least one of these properties and/or configuration settings.

The available tasks 406 may be stored in memory (not shown) or with the data 108. When the author 402 exits the simulated computer environment 110, the author 402 is returned to the simulation editor 404. In the simulation editor 404, the set of available tasks 406 are presented (indicated by the dashed box). A user interface (not shown) for the simulation editor 404 presents the available tasks 406 to the author 402. In one embodiment, the available tasks 406 are presented in a list box (not shown).

The author 402 selects at least one of the available tasks 406. For each available task 406 selected, an author 402 may define evaluation criteria 206 (See FIG. 2). As mentioned above, the evaluation criteria 206 may include a point value which is associated with the selected task 406. For each selected task 406, the point value may be the same or different.

The selected available task 406 is then converted to a required task 128 for the simulation 102 (See FIG. 1) being drafted. Conversion of an available task 406 to a required task 128 may simply involve moving a definition of the task 406 from one data window (not shown) in the simulation editor 404 to a second data window (not shown) which lists required tasks 128 of the simulation 102. Alternatively, the conversion may be more complicated. For example, each selected available task 406 may be associated with certain evaluation criteria 206 such as a point value. The author 402 may also be able to edit a description for each required task 128.

Preferably, the simulation editor 404 allows an author 402 to easily move tasks 114 from the set of available tasks 406 to the set of required tasks 128 and vice versa. In addition, tasks 114 may be deleted from the set of available tasks 406. The author 402 may also reexecute the simulated computer environment 110 and define new or additional available tasks 406.

In certain embodiments, the simulation editor 404 may include an initial condition editor (not shown). The initial condition editor may be integrated with or executed from the simulation editor 404. The initial condition editor allows an author 402 to edit initial condition data 122. As mentioned above, initial condition data 122 comprises a modification of a characteristic of a simulated component 118 in the simulated computer environment 110. Initial condition data 122 may also include adding a new component 118 or deleting a component 118 defined in the base data 120.

Referring still to FIG. 4, preferably, IT simulations 102 (See FIG. 1) drafted using the simulation editor 404 are prepared for use and distribution in certification exam software, training software and the like. In certain embodiments, the required tasks 128, evaluation criteria 206, and other information specific to a simulation 102, together comprise simulation data 124 (See FIG. 1). This simulation data 124, which essentially defines a simulation 102, may be stored in a simulation file 408.

Preferably, a simulation 102 and all the data needed to support it are reduced to the smallest possible size. The simulation editor 404 packages the base data 120, initial condition data 122, if there is any, the simulation file 408, and any simulators 106 which are associated with a simulation 102, into a distribution file 410. Generally, this packaging includes passing the files and data sets through one or more compression algorithms to reduce the required storage space for the distribution file 410. The files and data sets may be configured to automatically decompress when needed. Alternatively, the distribution file 410 may be decompressed manually to return the files and data sets to an operable condition.

Computer-executable code used to implement the evaluation engine 202 may be shared among simulations 102. Therefore, the shared computer-executable code may be stored as a DLL (Dynamic Link Library) to facilitate sharing. Generally, simulators 106 are computer-executable code. Computer-executable code and DLLs historically do not compress at high ratios. However, by using a compression algorithm tailored for executable code such as UPX (the Ultimate Packer for eXecutables), freely available on the Internet at http://upx.sourceforge.net/, the size of the distribution file 410 may be reduced.

Once a distribution file 410 is created, the file 410 may be certified to establish its authenticity. Certification is often required by sponsors of certification exams which will use the distribution file 410. Certification of a distribution file 410 helps to ensure the integrity of the certification exam. The distribution file 410 is preferably certified by digitally signing the file 410 using a public key-private key encryption algorithm. The digital signature may be authenticated through a trusted third party such as VeriSign of Mountain View, Calif. In addition, the distribution file 410 may be encrypted as well.

Once the distribution file 410 is certified, the file 410 may be stored on computer-readable media 412. The computer-readable media 412 may be used to store or transport a simulation 102 for use in a certification exam. The media 412 may be a DVD, CD-ROM, hard drive, floppy disk, database, or the like.

Thus, using the embodiment depicted in FIG. 4, an author 402 may quickly draft a simulation 102. The required tasks 128 for the simulation 102 may be generated simply by performing tasks within the simulated computer environment 110. Editors are also provided which allow the author 402 to edit the base data 120 and initial condition data 122.

Figure 5:
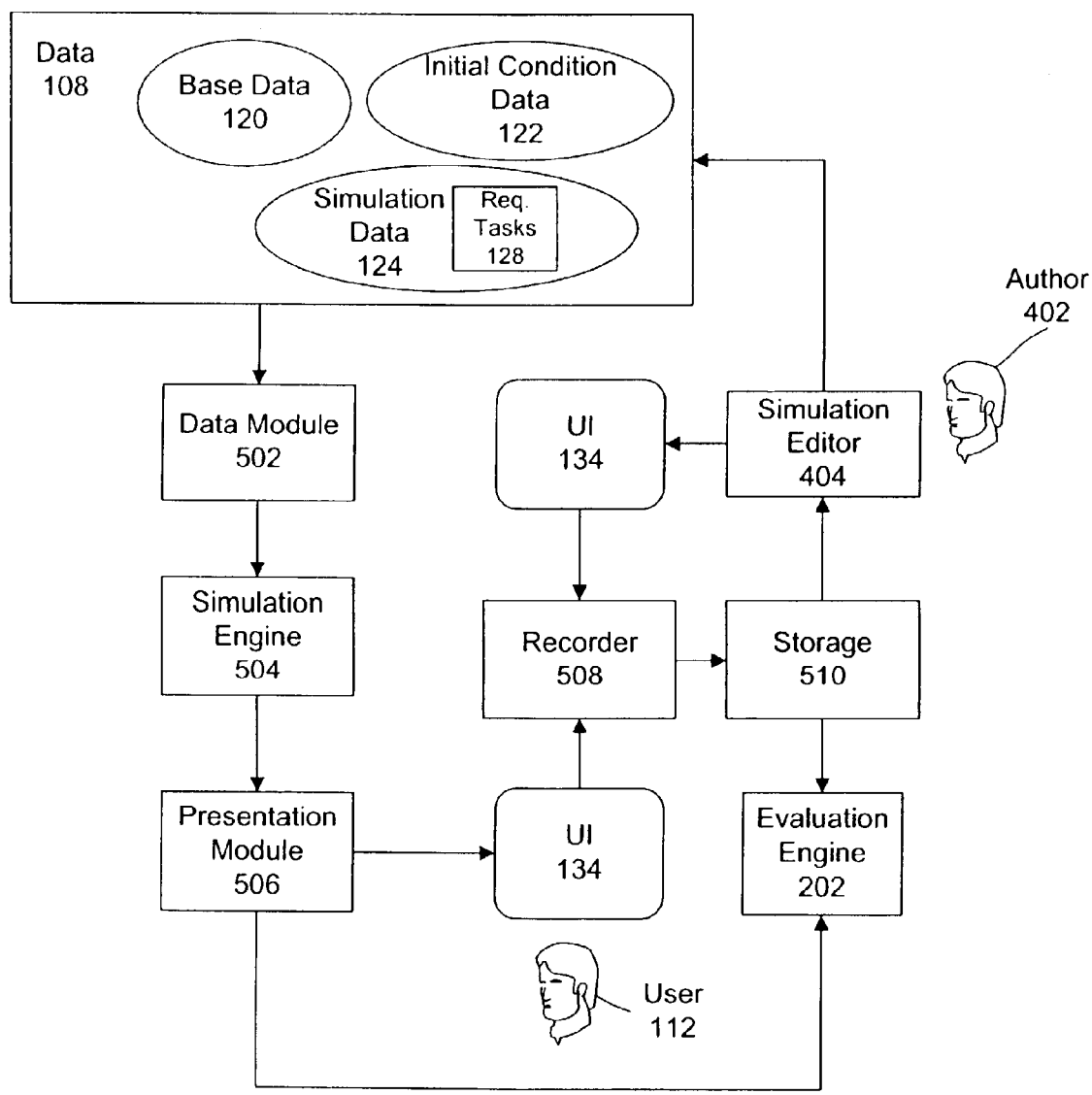
FIG. 5 is a block diagram illustrating a system for implementing the present invention according to one embodiment.

Referring now to FIG. 5, a system 500 depicts one embodiment for simulating a hypothetical computer environment using a simulated computer environment 110 and evaluating user performance within the simulated computer environment 110. The system 500 comprises data 108 which has been discussed in detail above.

A data module 502 is in communication with the data 108. The data module 502 accesses the data 108. Generally, the data module 502 is implemented using software modules for retrieving, updating, sorting, filtering, and augmenting the data. For example, a data module 502 may be an XML, ODBC (Open DataBase Connectivity), ORACLE®, SQL Server®, or other similar driver. Alternatively, a data module 502 may comprise software which includes drivers for accessing data in a variety of formats such as databases, XML files, delimited flat files, and the like.

The data module 502 communicates and cooperates with a simulation engine 504. The simulation engine 504 uses the data 108 to represent a simulated computer environment 110. The simulation engine 504 executes one or more simulators 106 (See FIG. 1) which comprise one or more simulated components 118 (See FIG. 1). The simulators 106 include software objects for implementing the simulated components 118.

The base data 120 associates values with the attributes of these software objects. Generally, the attributes correspond to characteristics of the simulated components 118 within the simulated computer environment 110. Initial condition data 122 is used to override certain characteristics of the simulated components 118 in the simulated computer environment 110. By changing the values, actual components which are inoperable, or improperly configured, may be simulated.

The system 500 includes a presentation module 506 which presents a simulation 102 (See FIG. 1) to a user 112. The presentation module 506 manages the IO (input/output) between the simulation engine 504 and the user 112. The presentation module 506 communicates with a user interface 134 similar to the one discussed in relation to FIG. 1. The user interface 134 presents the simulated computer environment 110 in a context and with a "look and feel" which is substantially the same as the actual user interface a user 112 uses to diagnose and solve actual IT problems. For example, the user interface 134 may include a simulator 106 (See FIG. 1) which simulates the buttons, windows, and other user interface elements (not shown) of a windows operating system.

The user interface 134 presents a simulation 102 (See FIG. 1) which includes a scenario 104 (See FIG. 1). The user 112 is permitted to interact with the simulator 106 (See FIG. 1) just as one would, for example, with an actual computer desktop associated with the scenario 104. The user 112 attempts to correctly complete the tasks 114 (See FIG. 1) set out in the scenario 104.

As a user 112 interacts with the simulated computer environment 110, a recorder 508 records a set of completed tasks 130 (See FIG. 1) which are performed by the user 112. The completed tasks 130 are preferably recorded on a storage device 510. The storage device 510 may be a disk drive, volatile memory, a special server, or the like.

An evaluation engine 202 (described in relation to FIG. 2) communicates with the presentation module 506 and the storage device 510. The evaluation engine 202 evaluates the set of completed tasks 130 (See FIG. 1) to determine the user's performance. Preferably, the evaluation engine 202 determines a score 204 (See FIG. 2) which rates the user's performance.

The evaluation engine 202 allows for flexibility in evaluating and scoring a user's performance as described in detail in relation to FIG. 2. Feedback indicating the user's performance may be provided directly to the user 112 by way of the user interface 134. Alternatively, the feedback, such as a score 204, may be provided to a certification exam authority (not shown). The evaluation engine 202 may determine a binary score, a partial score, a weighted score, a partially weighted score, or the like.

The system 500 may also include components which allow an author 402 to draft a simulation 102. A simulation editor 404 as described in relation to FIG. 4 may communicate with the data 108 and the user interface 134. Tasks performed by the author 402 may be recorded by the recorder 508 as available tasks 406 (See FIG. 4). The available tasks 406 are recorded on the storage device 510.

When the author 402 returns to the simulation editor 404, the available tasks 406 are presented to the author 402 for use in drafting a simulation 102.

Figure 6:
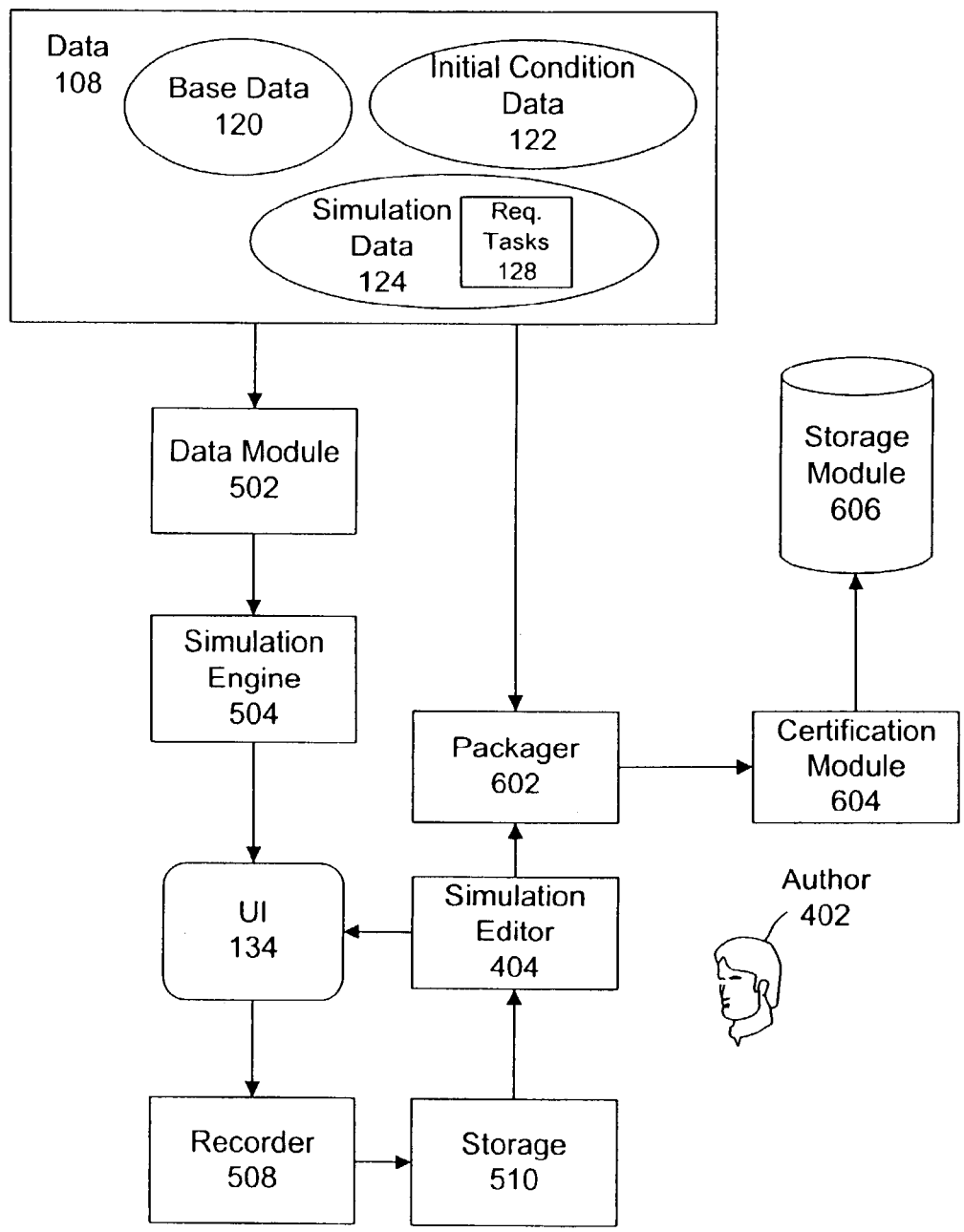
FIG. 6 is a block diagram illustrating a system for packaging and distributing a simulation developed using an embodiment of the present invention.

Referring now to FIG. 6, an alternative system 600 includes most of the same components as described in relation to FIG. 5. However, the system 600 also provides components which allow an author 402 to package and prepare a drafted simulation 102 for distribution.

The system 600 includes a packager 602 in communication with the simulation editor 404. Preferably, the simulation data 124 is stored within a simulation file 408 (See FIG. 4). Of course, the simulation data 124 may be stored in any suitable data structure. The packager 602 packages the base data 120, initial condition data 122, simulation file 408, and any simulators 106 (See FIG. 1) involved in a drafted simulation 102 into a distribution file 410 (See FIG. 4).

The distribution file 410 may be passed to a certification module 604. The certification module 604 certifies the authenticity of the distribution file 410. The certification may be accomplished by digitally signing the distribution file 410. Of course, other methods of certification may be used. For example, distribution files 410 may be registered with a trusted party. If the characteristics of the distribution file 410 differ from those registered, the distribution file 410 may be deemed uncertified. If there is no difference, the distribution file 410 may be deemed authentic.

Once certified, the distribution file 410 may be passed to a storage module 606, which stores the distribution file 410 until the simulation 102 contained therein is requested in a certification exam and/or training package. The distribution file 410 may be transmitted to multiple machines in a testing environment, to a user's personal computer, or the like. Generally, the data 108, and any simulators 106, are compact, such that computers having slow processors and/or limited memory and storage resources may still execute simulations 102.

FIG. 6 illustrates but one embodiment of a system 600 which allows the author 402 to package or prepare a drafted simulation 102 for use in a certification exam or training package. Those of skill in the art recognize that reducing the data and executable code to its smallest form is advantageous for transmission, storage, and maintenance of the drafted simulations 102. In addition, combining the components into a single distribution file 410 facilitates storage and maintenance of the simulation 102. Furthermore, digitally signing the distribution file 410 provides security assurances against tampering and helps ensure authenticity of the file 410.

Those of skill in the art recognize that these advantages may be met using different variations of the systems and methods described above. For example, base data 120 and initial condition data 122 may be stored on a central relational database server. The simulation data 124 may be stored in a compressed simulation file 408 which is encrypted and digitally signed. It is contemplated that the scope of the present invention includes these other variations and all others which are recognized by those of skill in the art.

Figure 7:
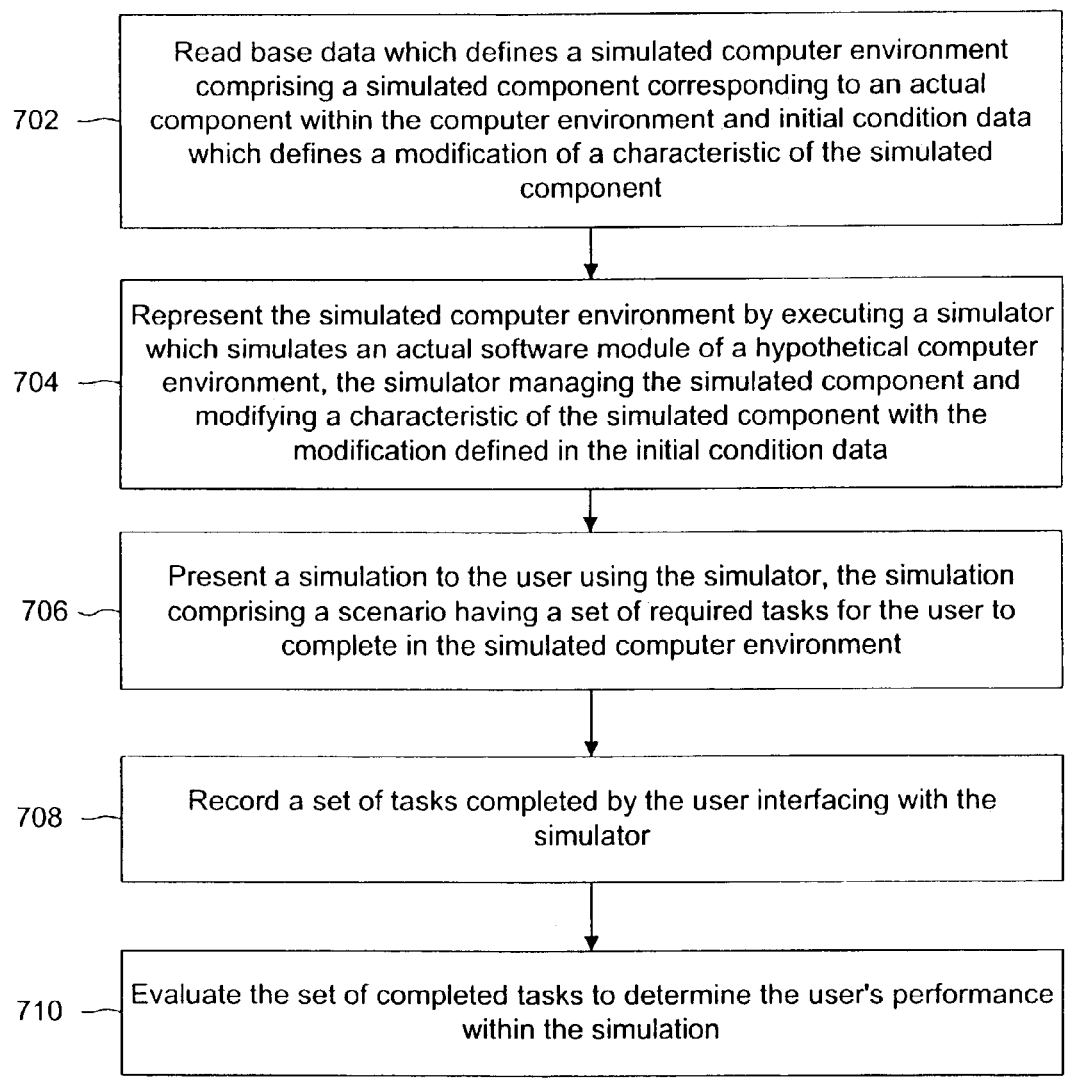
FIG. 7 is a flowchart of a method for simulating a hypothetical computer environment using a simulated computer environment and evaluating user performance within the simulated computer environment.

FIG. 7 illustrates a flowchart of a method 700 for simulating a hypothetical computer environment using a simulated computer environment 110 and evaluating user performance within the simulated computer environment 110. The method 700 begins by reading 702 base data 120 which defines a simulated computer environment 110 comprising a simulated component 118 that emulates an actual component within a computer environment. Initial condition data 122 is also read 702. The initial condition data 122 defines a modification of a characteristic of the simulated component 118. Alternatively, the initial condition data 122 may define a new simulated component 118 or delete an existing simulated component 118.

Thereafter, the simulated computer environment 110 is represented 704 by executing a simulator 106. The simulator 106 simulates an actual software module of the hypothetical computer environment. The simulator 106 manages the simulated component 118 and may modify a characteristic of the simulated component 118 using the modification defined in the initial condition data 122.

Next, a simulation 102 is presented 706 to a user 112 by way of the simulator 106. The simulation 102 comprises a scenario 104 having a set of required tasks 128 for the user 112 to complete in the simulated computer environment by interfacing with the simulator 106. Completed tasks 130 are recorded 708. Finally, the set of completed tasks 130 are evaluated 710 to determine the user's performance in the simulation 102.

Figure 8:
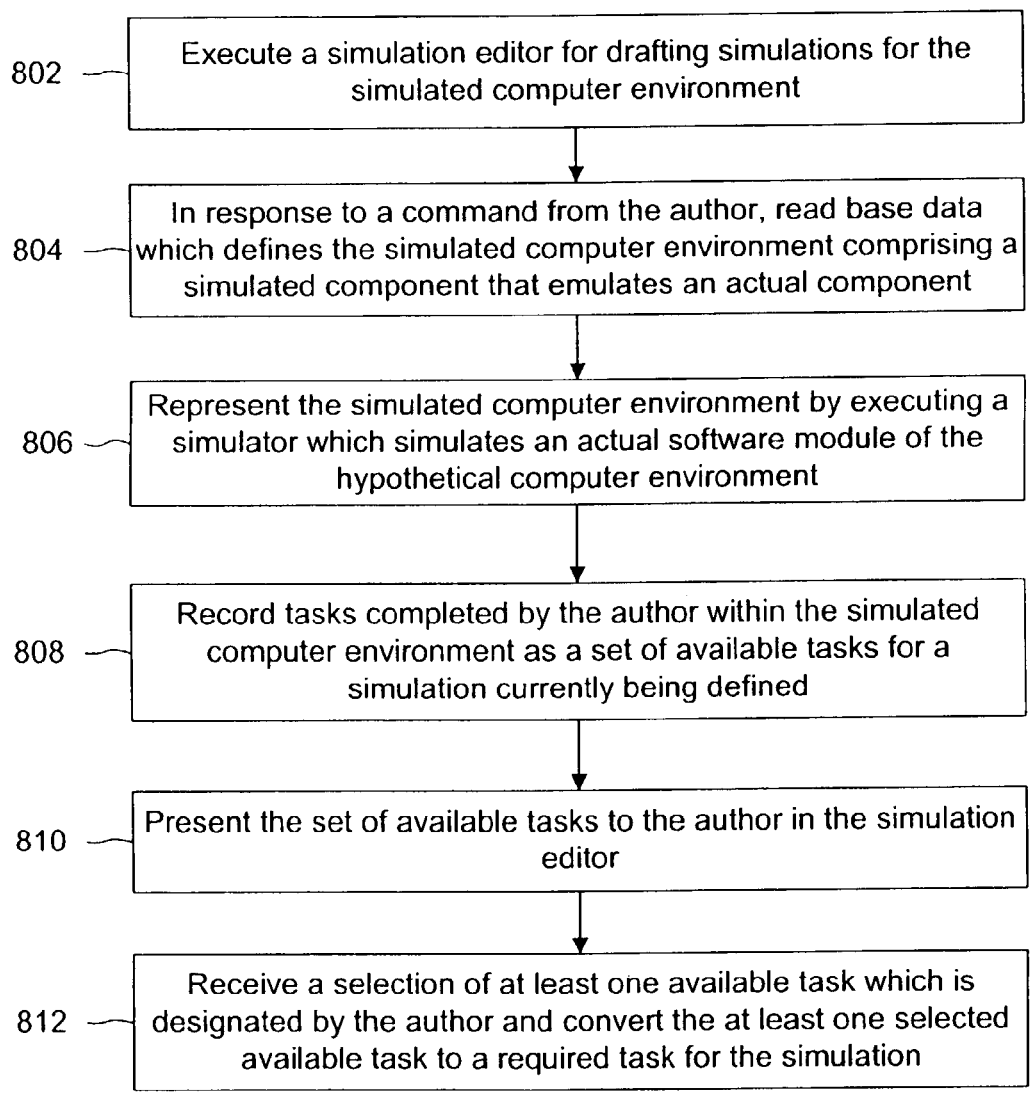
FIG. 8 is a flowchart of a method for drafting a simulation for a hypothetical computer environment using a simulated computer environment wherein the simulation is defined by an author interfacing with the simulation computer environment.

FIG. 8 illustrates a flowchart of a method 800 for drafting a simulation for a hypothetical computer environment using a simulated computer environment 110 wherein the simulation 102 is defined by an author 402 interfacing with the simulation computer environment 110.

The method 800 begins by executing 802 a simulation editor 404 for drafting simulations 102 for the simulated computer environment 110. Next, in response to a command from the author 402, base data 120 is read 804 to define the simulated computer environment 110 which comprising a simulated component 118 that emulates an actual component. Thereafter, the simulated computer environment 110 is represented 806 by executing a simulator 106. The simulator 106 simulates an actual software module of the hypothetical computer environment. The simulator 106 manages the simulated component 118 and may modify a characteristic of the simulated component 118 using the modification defined in the initial condition data 122.

Next, tasks 130 completed by an author 402 a simulation 102 within the simulated computer environment 110 are recorded 808 as a set of available tasks 406 for a simulation 102 currently being defined. The author 402 may complete many tasks 130 which are recorded 808.

When the author 402 finishes completing tasks 130, the author 402 is returned to the simulation editor 404. The author 402 is then presented 810 with the set of available tasks 406. Finally, a selection of at least one available task 406 designated by the author 402 is received 812 and converted to a required task 128 for the simulation 102.

Based on the foregoing, the present invention offers a number of advantages not available in conventional approaches. The present invention simulates a computer environment 110 such that a user 112 is provided with a realistic experience in configuring systems, trouble shooting, and resolving IT issues. The system and method allows a simulation author 402 to automatically define a set of possible tasks 406, for a simulation 102, by performing the desired tasks in the simulated computer environment 110. The present invention provides a robust evaluation process for simulations 102. The evaluation process allows for partial scores, weighted scores, or conventional binary scores to be awarded for performance in a simulation 102. In addition, simulations 102 within a certification exam may be weighted with respect to each other. The present invention further provides for rescoring of simulations 102 and simulation-based exam question seeding to improve the quality of the simulations 102 developed.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

The invention claimed is:

1. A method for simulating a hypothetical computer environment using a simulated computer environment and evaluating user performance within the simulated computer environment, the method comprising:
   reading base data which defines the simulated computer environment, the simulated computer environment comprising a simulated component that emulates an actual component and initial condition data which defines a modification of a characteristic of the simulated component;
   representing the simulated computer environment by executing a simulator which simulates an actual software module of the hypothetical computer environment, the simulator managing the simulated component and modifying a characteristic of the simulated component with the modification defined in the initial condition data;
   presenting a simulation to the user using the simulator, the simulation comprising a scenario having a set of required tasks for the user to complete in the simulated computer environment;
   recording a set of tasks completed by the user interfacing with the simulator; and
   evaluating the set of completed tasks to determine the user's performance within the simulation.

2. The method of claim 1, wherein evaluating the set of completed tasks comprises:
   reviewing the set of required tasks, the set of completed tasks, and evaluation criteria to determine a score for the user's performance within the simulation; and
   associating the score with the user and the simulation.

3. The method of claim 2, wherein the score is a full credit score which is determined when each of the required tasks corresponds to a completed task in the set of completed tasks.

4. The method of claim 2, wherein the evaluation criteria comprises a single point value assigned to each of the required tasks, and wherein when less than all of the required tasks have corresponding completed tasks, the score is for partial credit and comprises the sum of point values assigned to each of the required tasks which have corresponding completed tasks in the set of completed tasks.

5. The method of claim 2, wherein the evaluation criteria comprises a variety of point values with each required task being assigned one of the point values and wherein when less than all of the required tasks have corresponding completed tasks, the score is for partial credit and comprises the sum of point values assigned to each of the required tasks which have corresponding completed tasks in the set of completed tasks.

6. The method of claim 2, wherein based on the evaluation criteria, the score comprises a no-score assessment such that the score for the simulation has no affect on the user's overall score.

7. The method of claim 2, further comprising:
   modifying the set of required tasks;
   reviewing the modified set of required tasks, the set of completed tasks, and evaluation criteria to determine a re-score for the user's performance within the simulation; and
   associating the re-score with the user and the simulation.

8. The method of claim 1, wherein the simulation is incorporated in a software package which is administered by an administration engine and wherein evaluating the set of completed tasks comprises:
   receiving a score inquiry from the administration engine;
   reviewing the set of required tasks, the set of completed tasks, and evaluation criteria to determine a score for the user's performance within the simulation; and
   reporting the score to the administration engine.

9. The method of claim 8, wherein the software package is a certification exam and the administration engine is a certification exam engine.

10. The method of claim 8, wherein the software package is a training module and the administration engine is a training engine.

11. The method of claim 1, wherein the simulator comprises a user interface comprising substantially identical user interface controls, windows, error messages, pop-up windows, and user interface navigation functions as the actual user interface for the actual software module which the simulator emulates.

12. The method of claim 1, wherein the simulator simulates an actual operating system and corresponding user interface for the actual operating system.

13. A method for drafting a simulation for a hypothetical computer environment using a simulated computer environment wherein the simulation is defined by an author interfacing with the simulated computer environment, the method comprising:
   executing a simulation editor for drafting simulations for the simulated computer environment;
   in response to a command from the author, reading base data which defines the simulated computer environment comprising a simulated component that emulates an actual component;
   representing the simulated computer environment by executing a simulator which simulates an actual software module of the hypothetical computer environment;
   recording tasks completed by the author within the simulated computer environment as a set of available tasks for a simulation currently being defined;
   presenting the set of available tasks to the author in the simulation editor;
   receiving a selection of at least one available task which is designated by the author and converting the at least one selected available task to a required task for the simulation.

14. The method of claim 13, wherein the simulation is defined in a simulation file, the method further comprising:
   packaging the base data, initial condition data, simulation file, and simulator in a distribution file;
   certifying the authenticity of the distribution file; and
   storing the distribution file on computer-readable media for presentation of the simulation within a certification exam.

15. A system for simulating a hypothetical computer environment using a simulated computer environment and evaluating user performance within the simulated computer environment, the system comprising:
   a data module for reading base data which defines the simulated computer environment, the simulated computer environment comprising a simulated component that emulates an actual component and initial condition data which defines a modification of a characteristic of the simulated component;
a simulation engine in communication with the data module, the simulation engine representing the simulated computer environment by executing a simulator which simulates an actual software module of the hypothetical computer environment, the simulator managing the simulated component and modifying a characteristic of
the simulated component with the modification defined in the initial condition data;
a presentation module in communication with the simulation engine, the presentation module presenting a simulation to the user using the simulator, the simulation comprising a scenario having a set of required tasks for the user to complete in the simulated computer environment;
a recorder for recording a set of tasks completed by the user interfacing with the simulator; and
an evaluation engine for evaluating the set of completed tasks to determine the user's performance within the simulation.

16. The system of claim 15, wherein the evaluation engine reviews the set of required tasks, the set of completed tasks, and evaluation criteria to determine a score for the simulation and associates the score with the user and the simulation.

17. The system of claim 16, wherein the score comprises a full credit score which is determined when each of the required tasks corresponds to a completed task in the set of completed tasks.

18. The system of claim 16, wherein the evaluation criteria comprises a single point value assigned to each of the required tasks, and wherein when less than all of the required tasks have corresponding completed tasks, the score is for partial credit and comprises the sum of point values assigned to each of the required tasks which have corresponding completed tasks in the set of completed tasks.

19. The system of claim 16, wherein the evaluation criteria comprises a variety of point values with each required task being assigned one of the point values, and wherein when less than all of the required tasks have corresponding completed tasks, the score is for partial credit and comprises the sum of point values assigned to each of the required tasks which have corresponding completed tasks in the set of completed tasks.

20. The system of claim 16, wherein based on the evaluation criteria, the score comprises a no-score assessment such that the score for the simulation has no affect on the user's overall score.

21. The system of claim 15, wherein the simulation is incorporated in a software package which is administered by an administration engine and wherein the evaluation engine receives a score inquiry from the administration engine, reviews the set of required tasks, the set of completed tasks, and evaluation criteria to determine a score for the user's performance within the simulation, and reports the determined score to the administration engine.

22. The system of claim 21, wherein the software package is a certification exam and the administration engine is a certification exam engine.

23. The system of claim 21, wherein the software package is a training module and the administration engine is a training engine.

24. The system of claim 15, wherein the simulator comprises a user interface comprising substantially identical user interface controls, windows, error messages, pop-up windows, and user interface navigation functions to the actual user interface for the actual software module which the simulator emulates.

25. The system of claim 15, wherein the simulator simulates an actual operating system and corresponding user interface for the actual operating system.

26. A system for drafting a simulation for a hypothetical computer environment using a simulated computer environment wherein the simulation is defined by an author interfacing with the simulated computer environment, the system comprising:
a simulation editor for drafting simulations for the simulated computer environment;
a data module for reading base data which defines the simulated computer environment comprising a simulated component corresponding to an actual component within the computer environment;
a simulation engine in communication with the data module, the simulation engine representing the simulated computer environment by executing a simulator which simulates an actual software module of the computer environment;
a recorder for recording tasks completed by the author within the simulated computer environment as a set of available tasks for a simulation currently being defined;
wherein the simulation editor presents the set of available tasks to the author, receives a selection of at least one available task from the author, and converts the selected available task to a required task for the simulation.

27. The system of claim 26, wherein the simulation is defined in a simulation file, the system further comprising:
a packager for packaging the base data, initial condition data, simulation file, and simulator in a distribution file;
a certification module for certifying the authenticity of the distribution file; and
a storage module for storing the distribution file on computer-readable media for presentation of the simulation within a certification exam.

28. A computer-readable medium containing instructions for simulating a hypothetical computer environment using a simulated computer environment and evaluating user performance within the simulated computer environment, wherein the instructions comprise executable instructions for implementing a method comprising:
reading base data which defines the simulated computer environment, the simulated computer environment comprising a simulated component that emulates an actual component and initial condition data which defines a modification of a characteristic of the simulated component;
representing the simulated computer environment by executing a simulator which simulates an actual software module of the hypothetical computer environment, the simulator managing the simulated component and modifying a characteristic of the simulated component with the modification defined in the initial condition data;
presenting a simulation to the user using the simulator, the simulation comprising a scenario having a set of required tasks for the user to complete in the simulated computer environment;
recording a set of tasks completed by the user interfacing with the simulator; and evaluating the set of completed tasks to determine the user's performance within the simulation.

29. A computer-readable medium containing instructions for drafting a simulation for a hypothetical computer environment using a simulated computer environment wherein the simulation is defined by an author interfacing with the simulated computer environment, wherein the instructions comprise executable instructions for implementing a method comprising:

executing a simulation editor for drafting simulations for the simulated computer environment;

in response to a command from the author, reading base data which defines the simulated computer environment comprising a simulated component that emulates an actual component;

representing the simulated computer environment by executing a simulator which simulates an actual software module of the hypothetical computer environment;

recording tasks completed by the author within the simulated computer environment as a set of available tasks for a simulation currently being defined;

presenting the set of available tasks to the author in the simulation editor; and receiving a selection of at least one available task which is designated by the author and converting the at least one selected available task to a required task for the simulation.

\* \* \* \* \*